United States Patent [19]

Fuss

[11] Patent Number: 5,940,643
[45] Date of Patent: Aug. 17, 1999

[54] GUIDE ARRANGEMENT FOR FACILITATING INSERTION OF FILM LEADER INTO EASY-LOAD CAMERA

[75] Inventor: Timothy J. Fuss, Rochester, N.Y.

[73] Assignee: Eastman Kodak Company, Rochester, N.Y.

[21] Appl. No.: 09/017,940

[22] Filed: Feb. 3, 1998

[51] Int. Cl.[6] .................................................. G03B 17/24
[52] U.S. Cl. ........................................ 396/415; 396/440
[58] Field of Search .................................... 396/415, 440, 396/6

[56] References Cited

U.S. PATENT DOCUMENTS

| | | |
|---|---|---|
| 3,383,068 | 5/1968 | Winkler et al. . |
| 3,463,071 | 8/1969 | Winkler et al. . |
| 3,479,938 | 11/1969 | Winkler et al. . |
| 4,505,562 | 3/1985 | Hara et al. . |
| 4,530,582 | 7/1985 | Hara et al. . |
| 4,728,977 | 3/1988 | Yomogizawa et al. . |
| 4,752,797 | 6/1988 | Sekine et al. . |
| 4,956,658 | 9/1990 | Smart . |
| 4,992,812 | 2/1991 | Smart . |
| 5,255,034 | 10/1993 | Shimada et al. . |
| 5,302,992 | 4/1994 | Fuss et al. . |
| 5,450,150 | 9/1995 | Smart et al. ............................ 396/415 |
| 5,521,662 | 5/1996 | Suzuki . |
| 5,521,668 | 5/1996 | Ezawa ..................................... 396/415 |
| 5,546,148 | 8/1996 | Janson . |
| 5,682,566 | 10/1997 | Nakazawa et al. . |
| 5,754,905 | 5/1998 | Yamamoto ............................. 396/415 |

*Primary Examiner*—David M. Gray
*Attorney, Agent, or Firm*—Roger A. Fields

[57] ABSTRACT

A camera comprising a cartridge receiving chamber for receiving a film cartridge with a filmstrip having a film leader, a backframe opening at which the filmstrip is to be exposed during picture-taking, and a guide arrangement located to facilitate movement of the film leader towards the backframe opening when the film cartridge is placed in the cartridge receiving chamber, is characterized in that the guide arrangement has a pair of leader guide surfaces, a first one of which is configured to guide a curled corner segment of a reduced-width leading portion of the film leader, and a second one of which is configured to guide a curved transitioning longitudinal edge segment intermediate the reduced width leading portion of the film leader and a full width portion of the film leader.

7 Claims, 7 Drawing Sheets

GUIDE ARRANGEMENT FOR FACILITATING INSERTION OF FILM LEADER INTO EASY-LOAD CAMERA

FIELD OF THE INVENTION

The invention relates generally to the field of photography, and in particular to cameras. More specifically, the invention relates to a guide arrangement for facilitating insertion of a film leader that protrudes from a film cartridge into an easy-load camera.

BACKGROUND OF THE INVENTION

Prior art commonly assigned U.S. Pat. No. 5,546,148 issued Aug. 13, 1996 discloses an easy-load camera that includes a cartridge receiving chamber for receiving a film cartridge with a filmstrip having a film leader, a backframe opening at which the filmstrip is to be exposed during picture-taking, and a guide arrangement located to facilitate movement of the film leader towards the backframe opening when the film cartridge is placed in the cartridge receiving chamber.

The film leader has a reduced-width leading or forward-most portion and a full-width portion that is the same width as the remainder of the filmstrip. A curved transitioning longitudinal edge segment of the film leader extends from the reduced-width portion to the full-width portion. The reduced-width portion has a front corner segment along the same longitudinal edge as the curved transitioning edge segment, which may be inherently curled. This tends to impede movement of the film leader towards the backframe opening when the film cartridge is placed in the cartridge receiving chamber.

SUMMARY OF THE INVENTION

A camera comprising a cartridge receiving chamber for receiving a film cartridge with a filmstrip having a film leader, a backframe opening at which the filmstrip is to be exposed during picture-taking, and a guide arrangement located to facilitate movement of the film leader towards the backframe opening when the film cartridge is placed in the cartridge receiving chamber, is characterized in that:

the guide arrangement has a pair of leader guide surfaces, a first one of which is configured to guide a curled corner segment of a reduced-width leading portion of the film leader, and a second one of which is configured to guide a curved transitioning longitudinal edge segment intermediate the reduced width leading portion of the film leader and a full width portion of the film leader.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
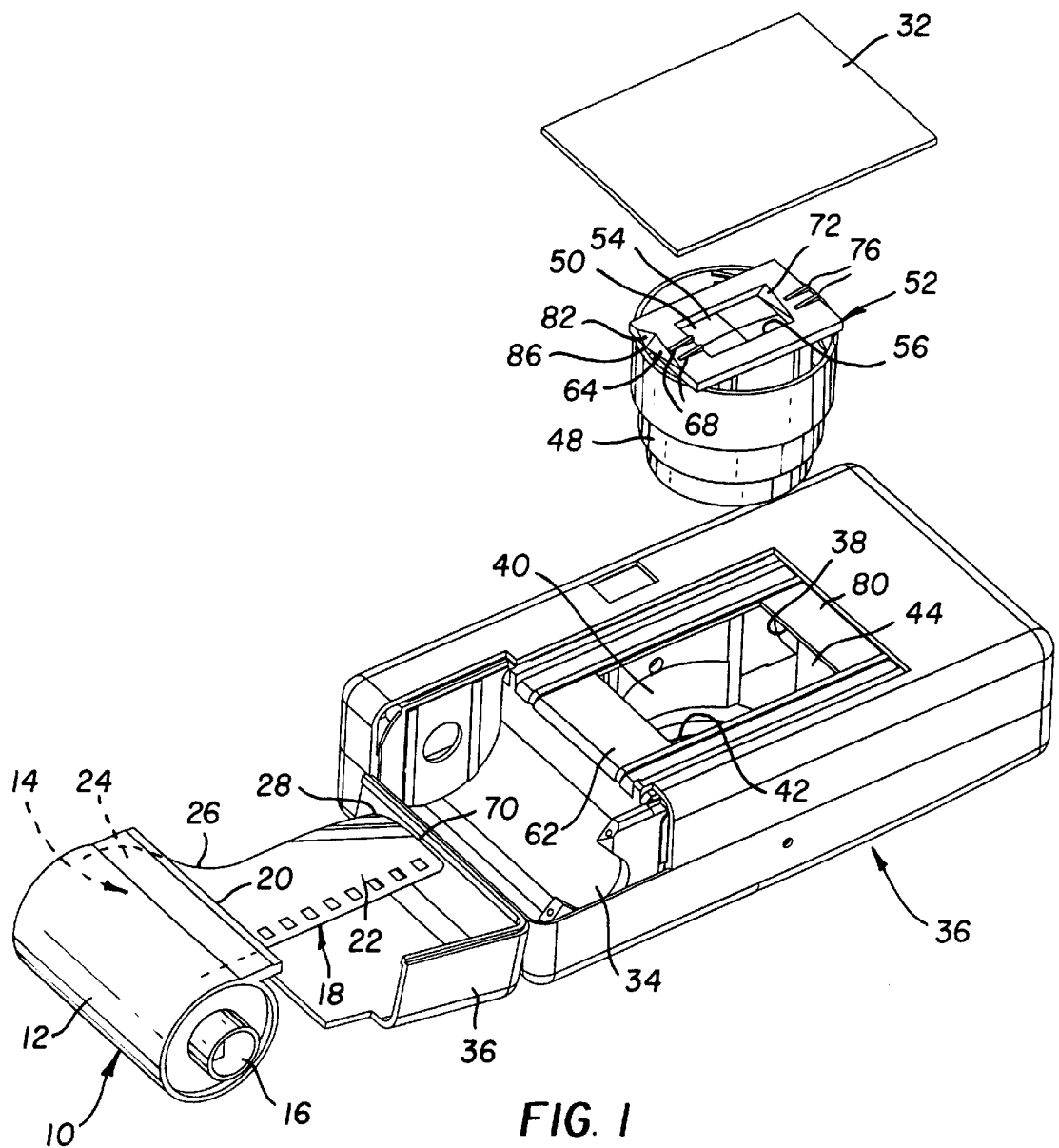
FIG. 1 is an exploded rear perspective view of an easy-load camera according to a preferred embodiment of the invention.
Figure 2:
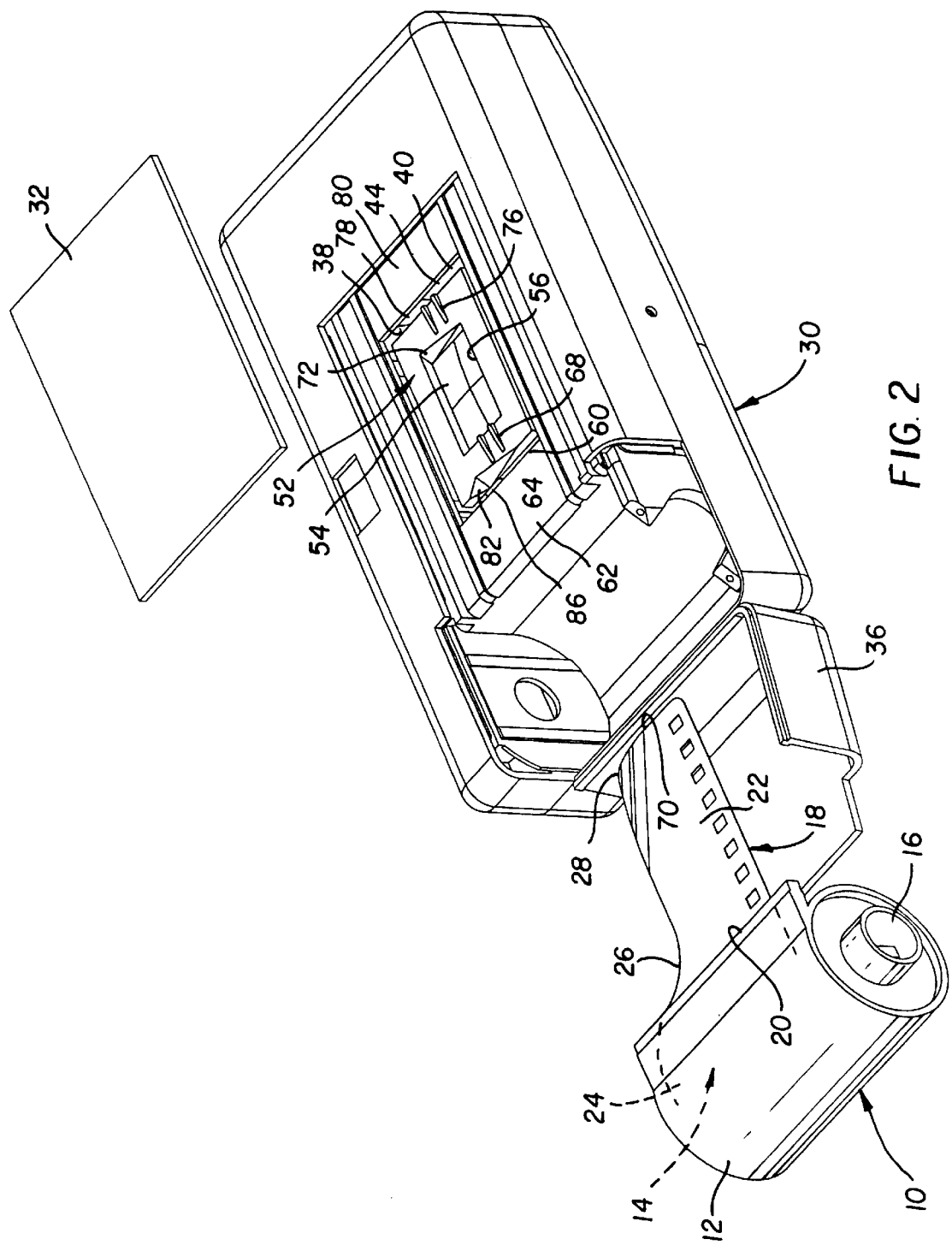
FIG. 2 is a partially assembled rear perspective view of the easy-load camera shown in FIG. 1.
Figure 3:
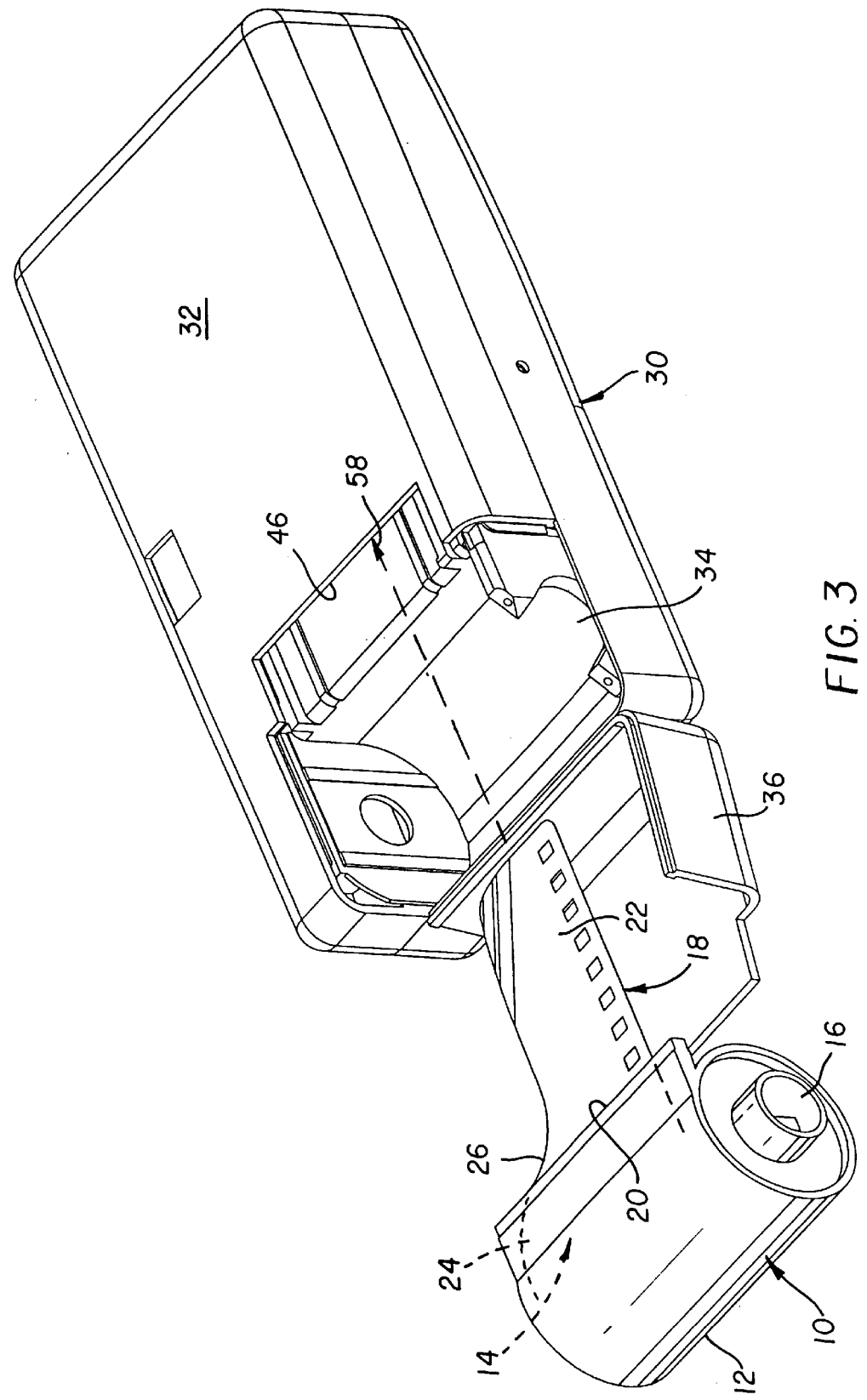
FIG. 3 is an assembled rear perspective view of the easy-load camera shown in FIG. 1.

Referring now to the drawings, FIGS. 1–3 show a conventional 35 mm film cartridge 10 comprising a light-tight housing 12 and a filmstrip 14. The filmstrip 14 is wound in a roll on a rotatable spool 16 inside the housing and has a film leader 18 that protrudes from the housing through a light-trapping slit 20 in the housing. The film leader 18 has a reduced-width leading or forward-most portion 22 and a full-width portion 24 that is the same width as the remainder of the filmstrip 14. A curved transitioning longitudinal edge segment 26 of the film leader 18 extends from the reduced-width portion 22 to the full-width portion 24 of the film leader. The reduced-width portion 22 has a front corner segment 28 along the same longitudinal edge as the curved transitioning edge segment 26, which can be inherently curled as shown in FIGS. 1–4 and 6.

An easy-load camera 30 intended for use with the film cartridge 10 is shown in FIGS. 1–3. FIGS. 1 and 2 show a back housing portion 32 removed for the sake of illustrating certain other parts of the camera 30. Conversely, FIG. 3 shows the back housing portion 32 in place. The camera 30 comprises a cartridge receiving chamber 34, a rear door 36 that is pivoted closed to close the cartridge receiving chamber, a rear backframe opening 38 (beneath the back housing portion 32) at which successive sections of the filmstrip 14 are to be exposed during picture-taking, and a cavity 40 having a front ambient light receiving opening 42 and a rear opening 44 at the backframe opening. A film ingress leader insertion slot 46 is located between the cartridge receiving chamber 34 and the backframe opening 38. See FIG. 3. A lens barrel 48 contains a known taking lens 50 and is movable in opposite directions forward and rearward within the cavity 40 between a rearward-retracted non-use position for storage, as shown in FIG. 2, and a forward-extended use position for picture-taking, not shown. A rear light baffle 52 is fixed to the lens barrel 48 over a back surface 54 of the taking lens 50 and is located in the backframe opening 38 when the lens barrel is in its non-use position as shown in FIG. 2. The rear light baffle 52 has a baffle opening 56 for the back surface 54 of the taking lens 50.

Figure 4:
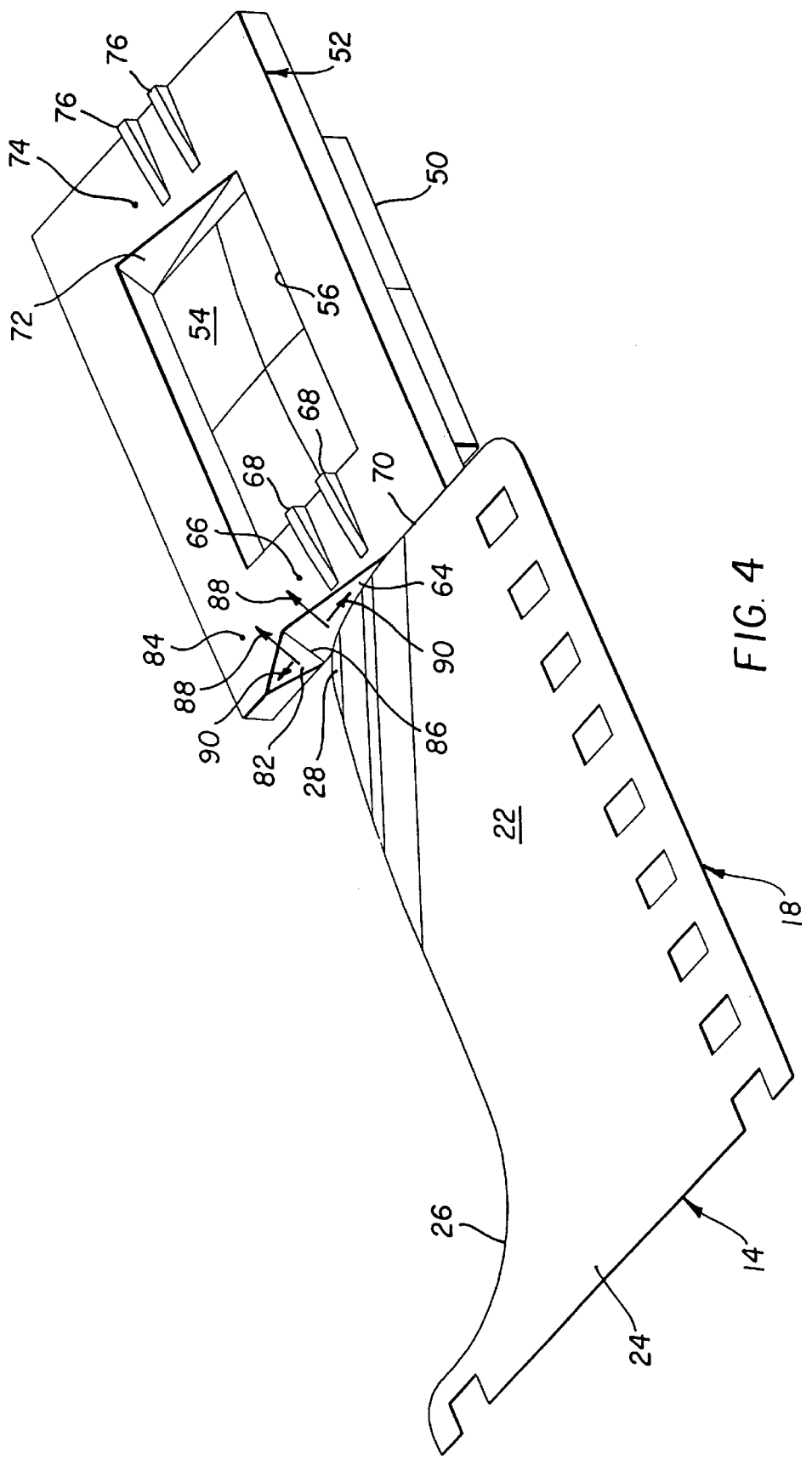
FIGS. 4, 5, 6 and 7 are rear perspective views of a film leader and a rear light baffle that has a baffle opening for the rear surface of a taking lens, depicting movement of the film leader to and across the baffle opening.
Figure 5:
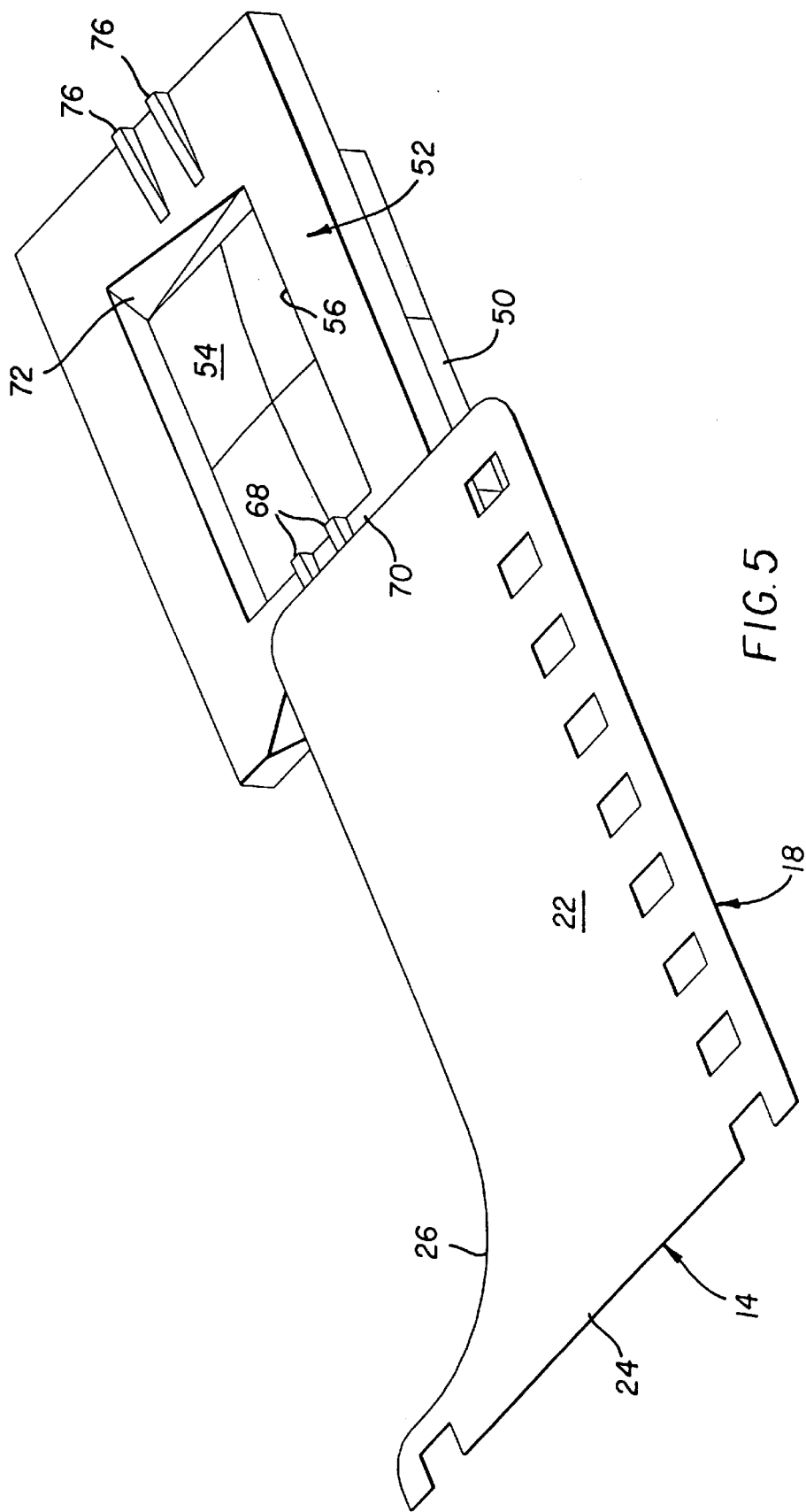
Figure 6:
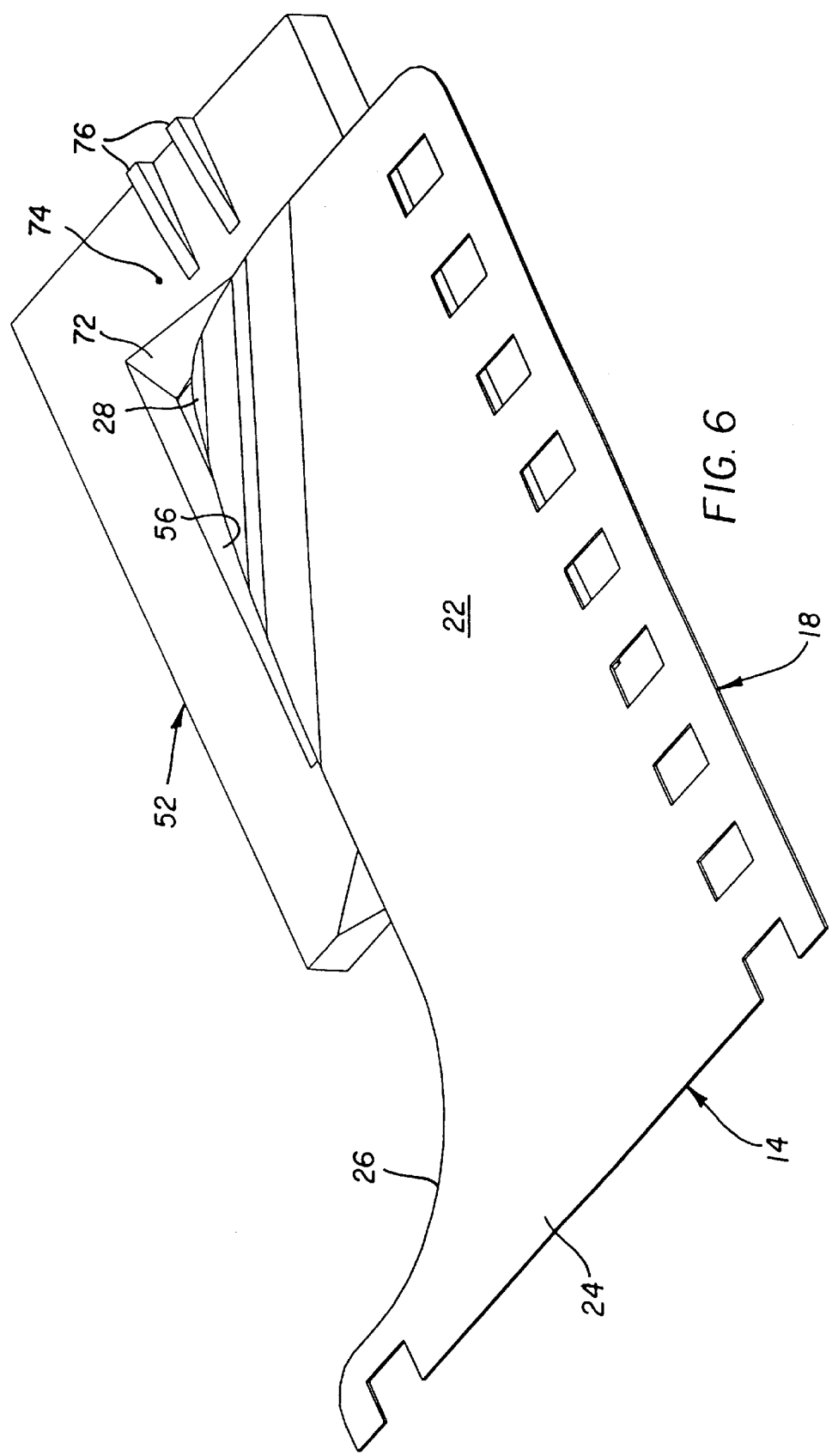
Figure 7:
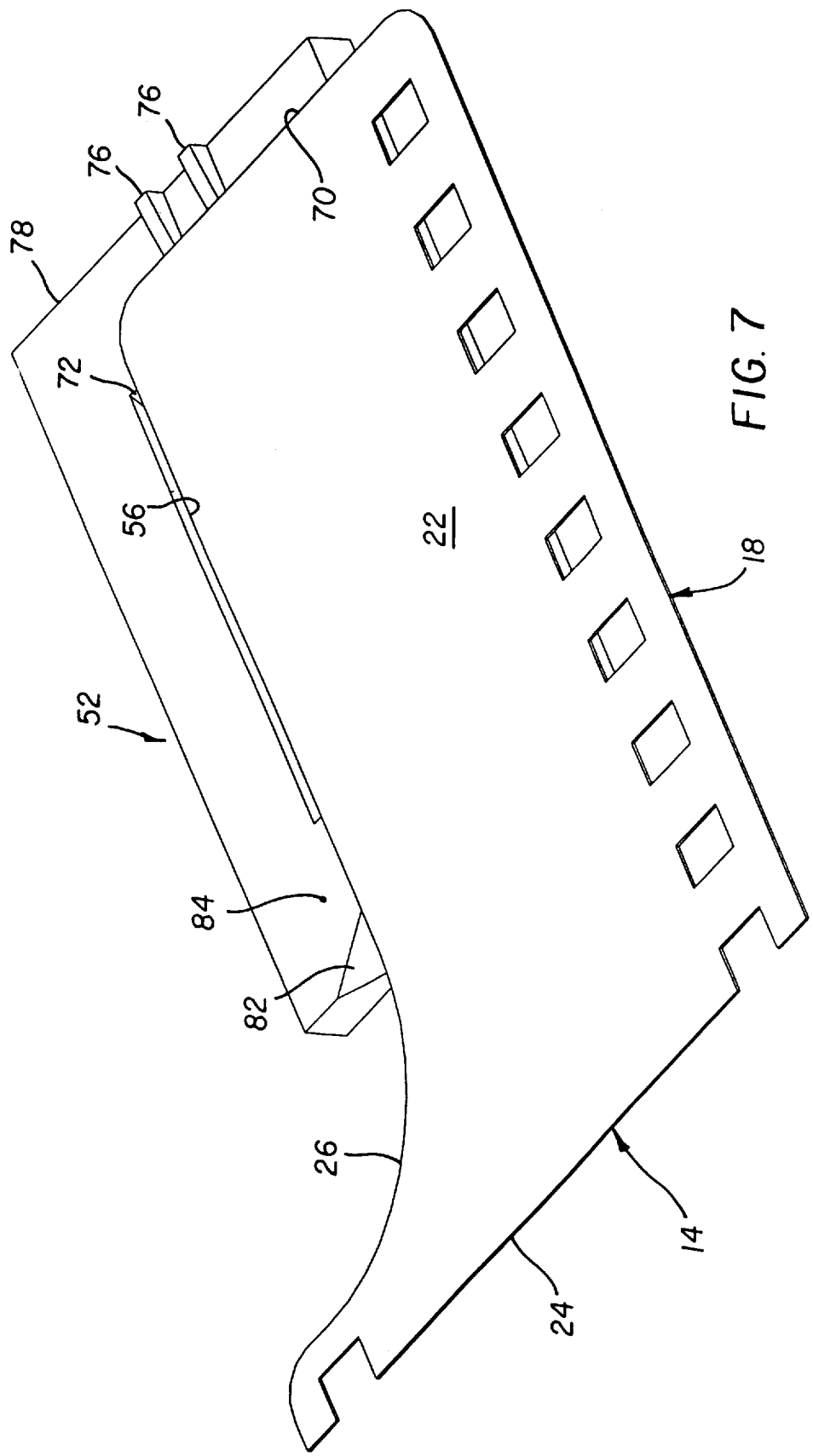

To load the film cartridge 10 into the camera 30, the film leader 18 beginning with its reduced-width leading portion 22 is manually inserted into the film ingress leader insertion slot 46 as indicated by the arrow 58 in FIG. 3. Then, the film cartridge 10 is manually placed in the cartridge receiving chamber 34. When the reduced-width leading portion 22 of the film leader 18 is manually inserted into the slot 46, the inherently curled corner segment 28 of the reduced-width leading portion is momentarily unsupported at a gap 60 between a flat 62 and the rear light baffle 52 and, thus, can tend to curl into the gap. However, to prevent the curled corner segment 28 from becoming trapped in the gap 60, a beveled guide surface 64 of the rear light baffle 52 acts to guide the curled corner segment from the gap 60 onto an area 66 of the rear light baffle as shown in FIG. 4. Next, as shown in FIG. 5, a pair of parallel identical guide ramps 68, 68 on the rear light baffle 52 raise the reduced-width leading portion 22 of the film leader 18 beginning at a leading edge 70 of the reduced-width leading portion to prevent the curled corner segment 28 from substantially contacting the back surface 54 of the taking lens 50 through the baffle opening 56 during movement of the reduced-width leading portion across the baffle opening. Next, as shown in FIG. 6, a beveled guide surface 72 of the rear light baffle 52 acts to guide the curled corner segment 28 from the baffle opening 56 onto an area 74 of the rear light baffle. Then, as shown in FIG. 7, a pair of parallel identical guide ramps 76, 76 on the rear light baffle 52 raise the reduced-width leading portion 22 of the film leader 18 beginning at the leading edge 70 of the reduced-width leading portion to prevent the curled corner segment 28 from becoming trapped in a gap 78 between the rear light baffle and a flat 80. And finally, a beveled guide surface 82 of the rear light baffle 52 acts to guide the curved transitioning longitudinal edge segment 26 of the film leader 18 that extends from the reduced-width portion 22 to the full-width portion 24 onto an area 84 of the rear light baffle. See FIG. 7.

As shown in FIG. 4, the beveled guide surfaces 64 and 82 form respective triangles that are contiguous at an identical base, i.e. a common boundary 86. The beveled guide surfaces 64 and 82 are each inclined in respective first directions 88, 88 that are the same as one another and are each inclined in respective second directions 90, 90 that are different than one other. The beveled guide surface 64 and the beveled guide surface 72 are identical. The guide ramps 68, 68 are longitudinally aligned with the guide ramps 76, 76.

The invention has been described with reference to a preferred embodiment. However, it will be appreciated that variations and modifications can be effected by a person of ordinary skill in the art without departing from the scope of the invention.

PARTS LIST 10. film cartridge
12. housing
14. filmstrip
16. spool
18. film leader
20. slit
22. reduced-width leading portion
24. full-width portion
26. curved transitioning longitudinal edge segment
28. inherently curled corner segment
30. camera
32. back housing portion
34. cartridge receiving chamber
36. rear door
38. backframe opening
40. cavity
42. front opening
44. rear opening
46. slot
48. lens barrel
50. taking lens
52. rear light baffle
54. back surface
56. baffle opening
58. arrow
60. gap
62. flat
64. guide surface
66. area
68, 68. guide ramps
70. leading edge
72. guide surface
74. area
76, 76. guide ramps
78. gap
80. flat
82. guide surface
84. area
86. identical base or boundary
88, 88. first directions
90, 90. second directions

What is claimed is:

1. A camera comprising a cartridge receiving chamber for receiving a film cartridge with a filmstrip having a film leader, a backframe opening at which the filmstrip is to be exposed during picture-taking, and a guide arrangement located to facilitate movement of the film leader towards said backframe opening when the film cartridge is placed in said cartridge receiving chamber, is characterized in that:

said guide arrangement has a pair of leader guide surfaces, a first one of which is configured to guide a curled corner segment of a reduced-width leading portion of the film leader, and a second one of which is configured to guide a curved transitioning longitudinal edge segment intermediate the reduced width leading portion of the film leader and a full width portion of the film leader, and said pair of leader guide surfaces are contiguous to touch one another along a common boundary and form respective triangles that have an identical base at said common boundary.

2. A camera as recited in claim 1, wherein a light-trapping film ingress leader insertion slot is located between said cartridge receiving chamber and said pair of leader guide surfaces.

3. A camera as recited in claim 1, wherein said pair of leader guide surfaces are differently inclined.

4. A camera as recited in claim 1, wherein said pair of leader guide surfaces are each inclined in respective first directions that are the same as one another and are each inclined in respective second directions that are different than one other.

5. A camera comprising a cartridge receiving chamber for receiving a film cartridge with a filmstrip having a film leader, a backframe opening at which the filmstrip is to be exposed during picture-taking, and a guide arrangement located to facilitate movement of the film leader towards said backframe opening when the film cartridge is placed in said cartridge receiving chamber, is characterized in that:

said guide arrangement has a pair of leader guide surfaces, a first one of which is configured to guide a curled corner segment of a reduced-width leading portion of the film leader, and a second one of which is configured to guide a curved transitioning longitudinal edge segment intermediate the reduced width leading portion of the film leader and a full width portion of the film leader;

an ambient light receiving cavity has a rear end at said backframe opening;

a lens barrel contains a taking lens and is movable within said cavity between a non-use position for storage and at least one use position for picture-taking;

a rear light baffle is fixed to said lens barrel over a back surface of said taking lens and is located at said backframe opening when said lens barrel is moved to its non-use position; and said pair of leader guide surfaces are integral with said rear light baffle.

6. A camera as recited in claim 5, wherein said rear light baffle has a baffle opening for said back surface of said taking lens and at least one leader guide ramp located between said pair of leader guide surfaces and said baffle opening and raised to prevent the curled corner segment of the reduced-width leading portion of the film leader from contacting said back surface of said taking lens through said baffle opening during movement of the film leader across said backframe opening.

7. A camera as recited in claim 6, wherein said rear light baffle has a leader guide surface identical to said leader guide surface that is configured to guide the curled corner segment of the reduced-width leading portion of the film leader in order to guide the curled corner segment from said baffle opening.

\* \* \* \* \*